Aug. 24, 1965 R. G. VANCE 3,202,017
ROLLER BELT AND DIFFERENTIAL PULLEY TRANSMISSION
Filed Aug. 27, 1963
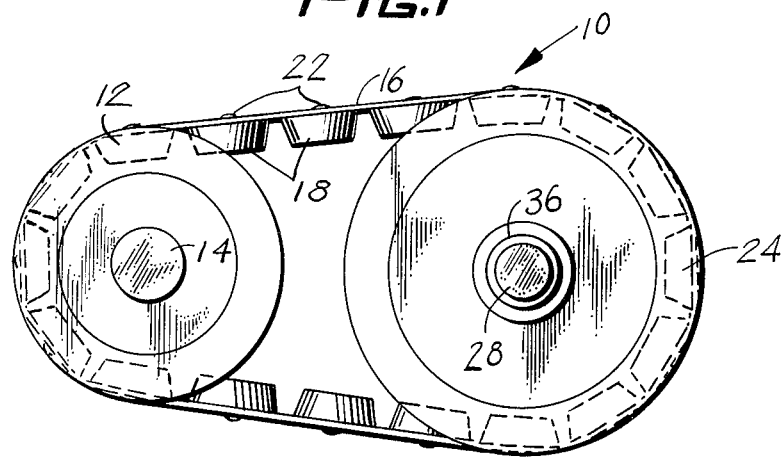
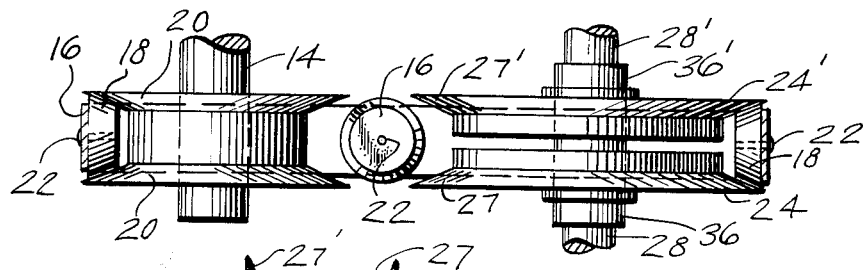
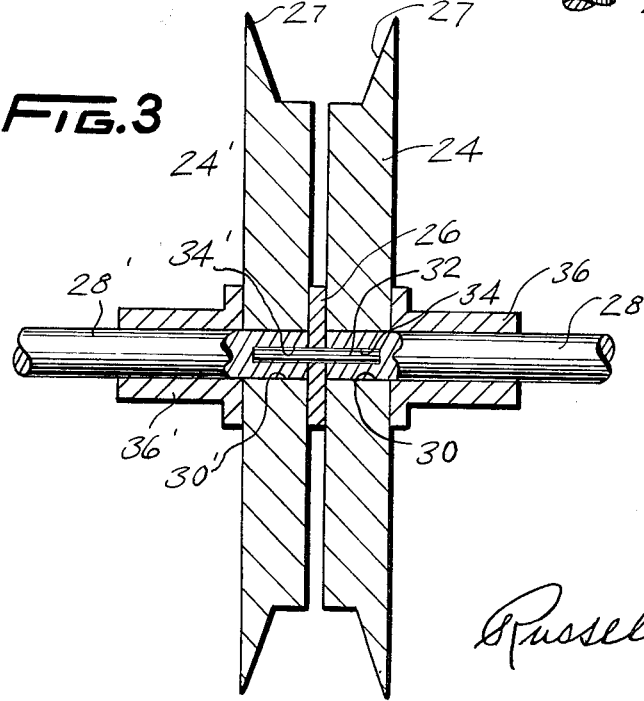
INVENTOR.
Russell G. Vance

United States Patent Office 3,202,017
Patented Aug. 24, 1965

3,202,017
ROLLER BELT AND DIFFERENTIAL
PULLEY TRANSMISSION
Russell G. Vance, 144 Tawas Lake Road,
East Tawas, Mich.
Filed Aug. 27, 1963, Ser. No. 304,866
6 Claims. (Cl. 74—722)

This invention relates to mechanical devices for producing differential drive action for power trains and the like.

It is a primary object of the present invention to provide a roller belt which will be used on lawn mowers, small walking and riding types of tractors, small automobiles, golf carts, or an advertising signs or displays and the like.

Another object of the present invention is to provide a roller belt which will transmit torque from the drive pulley to either one half section of a split driven pulley, thus serving to increase or decrease speed in relation to each other and simultaneously imparting an equal driving force to each side of the split driven pulley.

A futher object of the present invention is to provide a roller belt which will have spaced apart conical rollers which will impart the speed ratio in a rolling motion from the drive pulley to the split pulley which serves as a differential.

Other objects of the invention are to provide a roller belt bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side view of the present invention shown in elevation;

FIGURE 2 is a fragmentary top plan view of FIGURE 1; and

FIGURE 3 is an end view of the driven pulley shown in section.

Referring to the drawing, the roller belt 10 made in accordance with the present invention is shown to include a flanged drive pulley 12 having a shaft 14. Shaft 14 provides a means for imparting rotary force from a power source to drive pulley 12 and a continuous belt 16 made of suitable flexible material is received between the flanges 20 of pulley 12 and a plurality of conical rollers 18 are equally spaced apart, and their outer peripheries are in mating engagement with flanges 20 of pulley 12, and wedgingly engage flanges 20, thus providing a means for transferring rotary motion from drive pulley 12. Rollers 18 are provided with an axis pin 22, which is fixedly secured to belt 16, and the rollers 18 are freely rotatable upon axis pin 22 for a purpose which shall hereinafter be described.

Belt 16 and its associated conical rollers 18 are received between round driven pulley halves 24 and 24' which are spaced apart by means of spacer 26, and the outer periphery of rollers 18 in engaged with the flange 27 of pulley half 24 and with the flange 27' of pulley half 24', and thus provides a means of imparting differential motion to the pulley halves 24 and 24'. A shaft 28 is received within central opening 30 of pulley half 24 and a shaft 28' is received within pulley half 24', and the ends of shafts 28 and 28' abut with either side of spacer 26. An elongated pin 32 is frictionally received within opening 34 in the end of shaft 28 and is frictionally received within the opening 34' in the end of shaft 28', thus aligning shafts 28 and 28' and providing a means for retaining spacer 26 in position. A flanged bushing 36 is received over shaft 28 and a flanged bushing 36' is received over shaft 28', thus providing support means and bearing means for the shafts 28 and 28'.

In operation, shaft 14 when driven by a power source rotates and the rollers 18 rotatably secured to belt 16 wedgingly encroach the flanges 20 of drive pulley 12 and transmit rotary motion by means of the endless belt 16 to the driven pulley halves 24 and 24'.

Rollers 18 engage the flanges 27 and 27' of pulley halves 24 and 24' and a differential drive motion is imparted to the individual shafts 28 and 28', thus providing a differential mechanism which is useful for many types of drive mechanisms without employing gears or gear boxes.

It shall be recognized that the differential drive mechanism heretofore described provides a very inexpensive way to produce differential drive action.

While various changes may be made in the detail construction, it shall be understood that such changes shall be within the spirit and scope of the present invention as defined by the appended claims.

What I claim as new and desire to protect by Letters Patent of the United States is:

1. A roller belt and differential pulley transmission in combination comprising, a flanged drive pulley providing a means for frictionally receiving said belt, a drive shaft supporting said drive pulley and providing a means for transferring power from a power source to said drive pulley, a pair of driven pulley halves engaged by said belt and providing a means for converting the rotary motion from a plurality of conical rollers secured to said belt to a differential drive action imparted to a pair of shafts received by said driven pulley halves, a spacer disposed between said pulley halves providing a means for aligning said shafts of said pulley halves and a pair of bushings providing support means and bearing means for said shafts of said driven pulley halves.

2. The combination according to claim 1 wherein said plurality of conical rollers are secured to said belt by an axis pin, said axis pin permitting freely rotatable motion of said rollers when said rollers are received by said driven pulley halves.

3. The combination according to claim 2 wherein the outer periphery of said rollers matingly engage the angular flanges of said driven pulley and thus in operation encroach wedgingly against said flanges of said drive pulley and transmit the motion of said drive pulley to said driven pulley halves.

4. The combination according to claim 3 wherein said rollers when received between the flanges of said driven pulley halves provide a differential motion to said driven pulley halves by rotation of said rollers on said pins received through said rollers so that one or the other of said pulley halves may rotate at a different speed with rotation to the other of said pulley halves, providing a useful differential motion for various applications.

5. The combination according to claim 4 wherein each of said pair of shafts abuts said spacer between said driven pulley halves, and an elongated pin is received through said spacer and into adjacent ends of said shafts of said driven pulley halves and said pin provides alignment of said shafts along the longitudinal axis of said shafts.

6. The combination according to claim 5 wherein one of said bushings is rotatably received on each of said shafts of said driven pulley halves, said bushings being flanged.

References Cited by the Examiner

UNITED STATES PATENTS 2,952,167  9/60  Nelson _____ 74—689

DON A. WAITE, *Primary Examiner.*